Feb. 17, 1970 D. V. RYER 3,496,340

RECORD HANDLING APPARATUS

Filed June 30, 1965 6 Sheets-Sheet 1

INVENTOR
DAMOND V. RYER
BY Richard J. Donahue
John J. McCormack
AGENT & ATTORNEY Feb. 17, 1970 D. V. RYER 3,496,340

RECORD HANDLING APPARATUS

Filed June 30, 1965 6 Sheets-Sheet 2

INVENTOR
DAMOND V. RYER
BY Richard J. Donahue
John J. McCormack
AGENT & ATTORNEY INVENTOR
DAMOND V. RYER
BY Richard J. Donahue
John J. McCormack
AGENT AND ATTORNEY INVENTOR
DAMOND V. RYER
BY Richard J. Donahue
John J. McCormack
AGENT & ATTORNEY INVENTOR
DAMOND V. RYER
BY Richard J. Donahue
John J. McCormack
AGENT & ATTORNEY Feb. 17, 1970 D. V. RYER 3,496,340

RECORD HANDLING APPARATUS

Filed June 30, 1965 6 Sheets-Sheet 6

INVENTORS
DAMOND V. RYER
BY Richard J. Donahue
John J. McCormack
AGENT & ATTORNEY 3,496,340
Patented Feb. 17, 1970

1

3,496,340
RECORD HANDLING APPARATUS

Damond V. Ryer, Newton, Mass., assignor to Honeywell Inc., Minneapolis, Minn., a corporation of Delaware Filed June 30, 1965, Ser. No. 468,410
Int. Cl. G06k 7/00, 9/00; G01n 21/30
U.S. Cl. 235—61.11 4 Claims

ABSTRACT OF THE DISCLOSURE

A document scanning apparatus for interpreting code marks passing along an optical track having a "neutral" path and various "misregistration" paths. A bank of sensing cells is arranged to bracket the optical track and registration means are provided to select the outputs of the sensing cells which are in register with the code marks. The selected sensing cell outputs are fed to code interpreting means for reading of the code signals.

The present invention relates to new and improved document interpreting apparatus, and in particular to apparatus for determining the registration of reading means relative to encoded mark patterns interpreted thereby.

The quick and accurate interpretation of data manifestations has become important in the data processing arts, especially as related to returnable media, which are subject to rough usage and desirably should be readable a number of times. Commonly, such media present indicia which are encoded in an optically-sensible bar code system and require an appropriate bar code recognition system for the interpretation thereof. Such a system characteristicly scans across a first dimension of a document and at each scanning position interprets indicia at a number of vertical (row) positions. Because of this, the vertical alignment and registration of the document becomes critically important since misalignment can readly lead to erroneous interpretation of the data indicia which are "position-encoded." Thus, workers in the data processing arts increasingly feel the need for improved bar code recognition systems which solve the problem of alignment during scanning. The present invention provides a solution to this problem by the use of an array of scanning cells which are uniquely controlled by a novel registration-select system. This system is arranged so that certain ones in a bank of "read-cells" are automatically selected, during a "registration sequence" whereby the vertical position of the bar marks is established, though this may vary from record to record.

Prior art recognition systems have approached the registration problem with devices which either move the detection means or move the record document; either expedient being cumbersome and slow. For instance, it has been commonly necessary, heretofore, to detect a "reference position" along the vertical dimension of the record to move the record so that "record position" coincides with a reference "scanning position." It will be obvious that the processing time and equipment necessary for this are considerable and best avoided. Thus, the invention provides an improvement over the foregoing type of prior art devices by eliminating the necessity for moving elements or for referencing on a "home" reading position. The system provided according to the invention is also markedly improved in simplicity and economy over these used heretofore. Being thus simplified and having eliminated the need for mechanical translations, the invention greatly enhances the speed and reliability of mark readout. Therefore, it is a primary object of the present invention to provide mark reading apparatus which overcomes the foregoing disadvantages and simplifies the registration of a mark en-

2 coded record relative to interpreting means. Another object is to provide such a system which operates simply and references electronically, without requiring mechanical movements other than simple record translation past a read-station.

Still another object is to provide such a registration select system wherein the selectable scanning positions may be contiguous or even overlap.

Still another object of the invention is to provide such a registration-select system having a "fail-safe" feature in referencing upon a central position automatically in the event of inadequate or ambiguous selection signals.

The invention which constitutes the instant subject matter comprises a system for sensing indicia manifested in the form of binary mark pairs on a unit record, these marks being impressed upon a prescribed record zone. A mark sensing station is provided including a source of radiant energy and responsive optical means for sensing the encoded marks (bar) using a vertical bank adapted to emit mark-indicating pulses of optical transducers. These transducers are electrically referenced and controlled by a selection system adapted to electrically couple selected ones thereof to energize read-input means, this selection being made at prescribed times for each record. Also provided are read detector means including mark interpretations means connected to said read input means and adapted to compare successive pulses from the selected ones of said transducers and thus responsively generate binary-encoded-output signals according to the value and order of pulse pairs. Although the invention is useful with various kinds of unit records, it will be explained and illustrated with respect to a returnable document reader for optically interpreting encoded binary information impressed in the form of a di-bit bar code along a plurality of tracks on the document. A somewhat different but related type of document is disclosed in a co-pending application by Walter H. Gray et al. entitled "Information-Bearing Document," Ser. No. 259,927 filed Feb. 18, 1963 and assigned to the assignee of the instant case.

These and other novel features of the invention, together with further objects and advantages thereof, will become apparent from the following detailed specification with reference to the accompanying drawings, in which.

Figure 1:
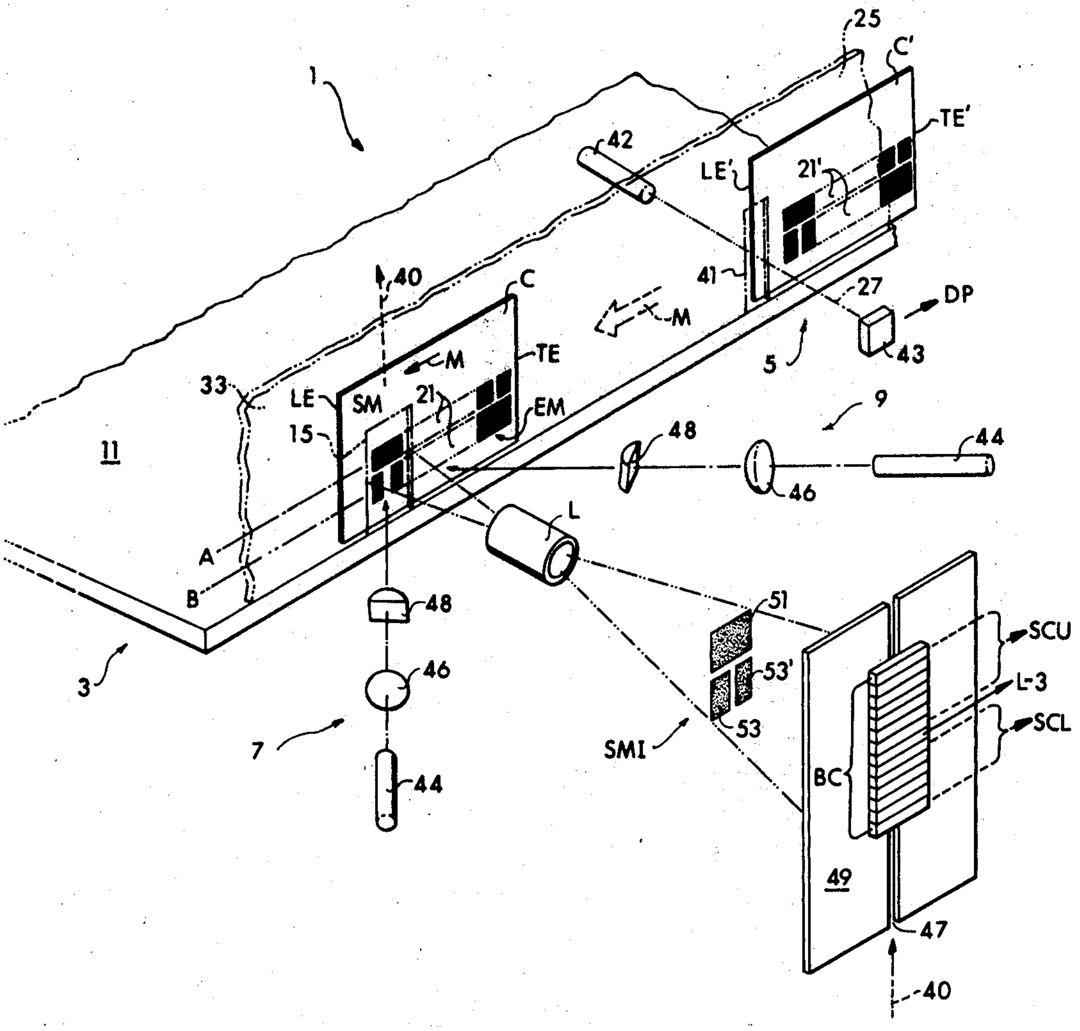
FIGURE 1 is a schematic perspective illustration of the optical and mechanical features of a document readout station for applying a preferred embodiment of the invention.
Figure 3:
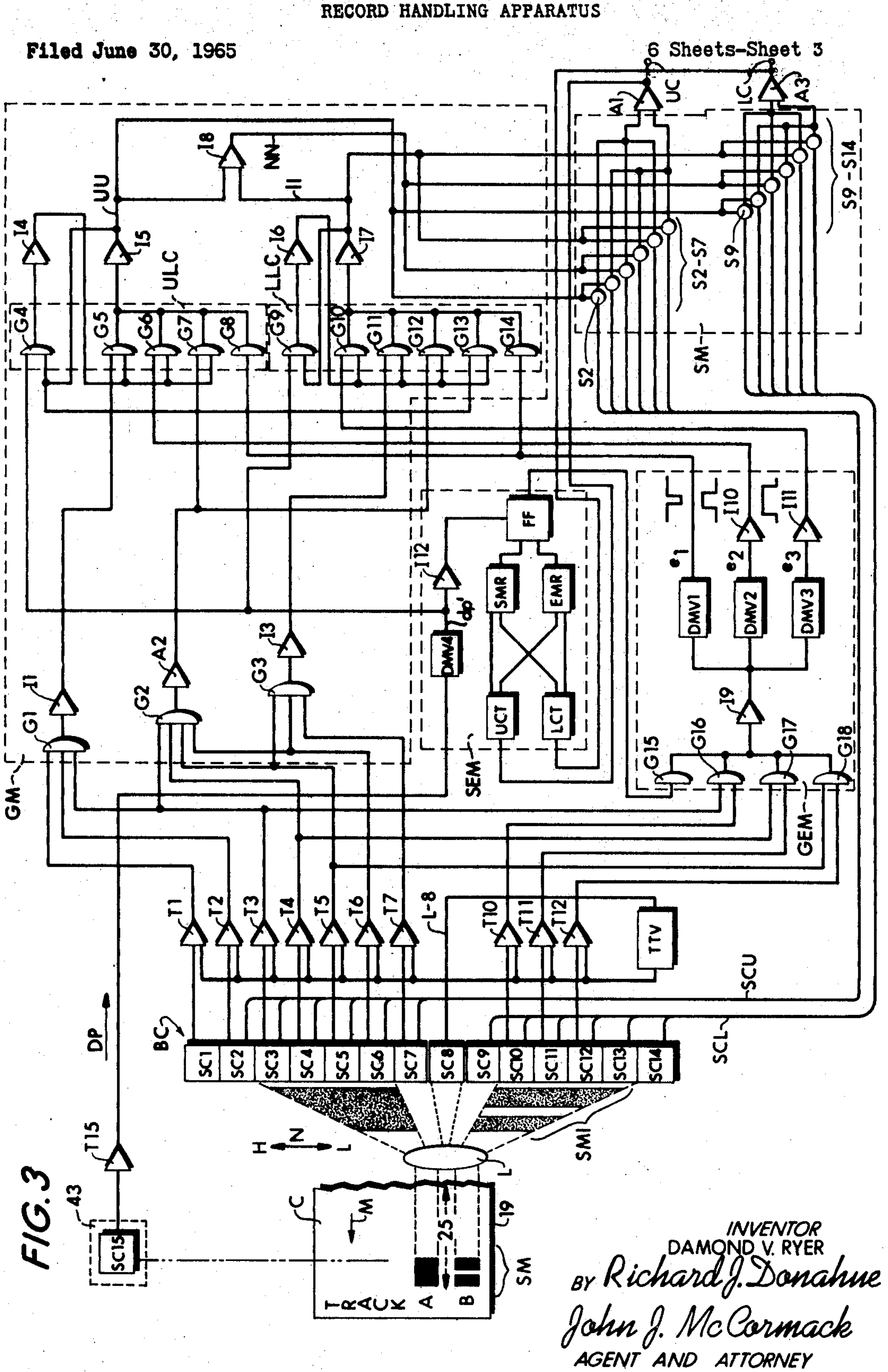
FIGURE 3 is a schematic block diagram of the registration-selection and control arrangement provided according to the invention for the transducers indicated in FIGURES 1 and 2.

FIGURE 1 shows a document interpreting station 1, according to the preferred embodiment for sensing the bar-encoded coupons C, C′ translated therethrough. It will be understood that interpreting station 1 includes a document transport means (not shown) for translating card (or coupon) documents C, C′ successively along a reference surface, or deck, 11. Cards C, C′ are translated past a scanning aperture 15 (in the direction of arrow M) in an optical mask 33 so that a mark image SM may be presented in operative relation to a reading transducer means BC. Mask 33 is, of course, shown in phantom to better illustrate cards C, C′ behind it. Encoded data manifestations 21 are impressed on coupons, C, C′ etc. in the form of di-bit marks, or printed bars 21 along a pair of spaced tracks (along axes A, B) thereof along a portion of cards C, C′ etc. These "di-bit" bars comprise identical black (printed) or white (unprinted) zones in one or more tracks (A, B) as indicated. It will be understood that such marks are so employed for more efficient and reliable reading; for instance, to allow a redundant encoding to be used for greater read-out reliability, especially in the face of the partial obliterations, smudges, etc. endemic to returnable forms of such documents. Di-bit marks 21 along tracks A, B are correlatively positioned vertically along the same column, being separated by an intermediate "non-data" (unprinted) white strip (FIGURE 3). Tracks A and B are also spaced from the lower edge 9 (9′) of cards C (C′) a prescribed amount. Cards C, C′ are normally slid along reference deck 11, although variations of this spacing are possible due to such things as faulty printing on the coupon, faulty cutting thereof, unevenness of desk 11, jiggling of the transport means, etc. Such variations in spacing, as well as relative variations in the vertical position of the sensor array BC will, of course, present a registration problem along the vertical (or columnar) direction (arrow 40). It will be apparent that vertical misregistration will constitute a displacement of the tracks A and B from normal "home" (or reference) loci (axes A, B respectively) in constant relation with transducer means BC.

Thus, interpreting station 1 will be seen to generally comprise, functionally, a document read-positioning arrangement 3 arranged to present documents C, C′ etc. transported thereby at a prescribed location and speed for interpretation and mark-sensing thereof by transducer means BC. Prescribed portions of documents C, C′ are sequentially illuminted by radiation assemblies 7, 9 so as to present an optical image (SMI) of marks 21 adjacent transducer means BC. Upstream of read-positioning assembly 3 is an approach-detecting assembly 5 for electrically indicating the approach of documents C, C′ to be thereafter read.

It will be apparent that approach-detecting assembly 5 is arranged to position documents being transported therepast along an extension of deck 31 and behind a mask means 25 (which may be a mere extension of mask 33) having a window or aperture 41 therein. Window 41 is in optical registry with a detector 43 and associated radiator 42 arranged to be operable along an approach axis 27. Thus it is apparent that as an approaching document C′ is transported (by means not shown) so that its leading edge LE′ passes window 41 to intersect approach axis 27 it will so modify the energization state of detector 43 as to induce the generation of an "approach signal" DP. This signal is thereafter used for control purposes as explained below.

As the card is transported further downstream from detector assembly 5 and the leading edge LE thereof comes adjacent a read-window 15 in mask 33 (defining the reading zone) mark sensing may begin of marks 21 sequentially along axes A, B of documents C, C′. The initial marks 21 often comprising a special "start" mark pattern SM indicated also at mark image SMI. It will be apparent that this image has been projected from document C adjacent transducer assembly BC having been irradiated by radiator assemblies 7, 9 each comprising similar lamps 44, and focusing means 46, 48. As shown, image SMI comprises an upper mark 51 and a pair of narrower lower marks 53, 53′. Portions of mark SM along a common vertical reading axis 40 will be detected by selected ones of transducer cells SC1 through SC14 (FIGURE 2 etc.) in transducer array BC. More particularly, cells SC1 through SC14 are arranged behind a sensor mask 49 having a vertical aperture 47 therein to be aligned along reading axis 40. It will become apparent as the description proceeds that a feature of the invention is that prescribed ones of cells SC1 through SC14 may be selected for reading by novel "registration-select" control means; cell bank BC being used to register-select as well as to read the bars 21 along documents C, C′, etc as it is translated past aperture 15.

OPERATION OF REGISTRATION-SELECT MEANS

Figure 2:
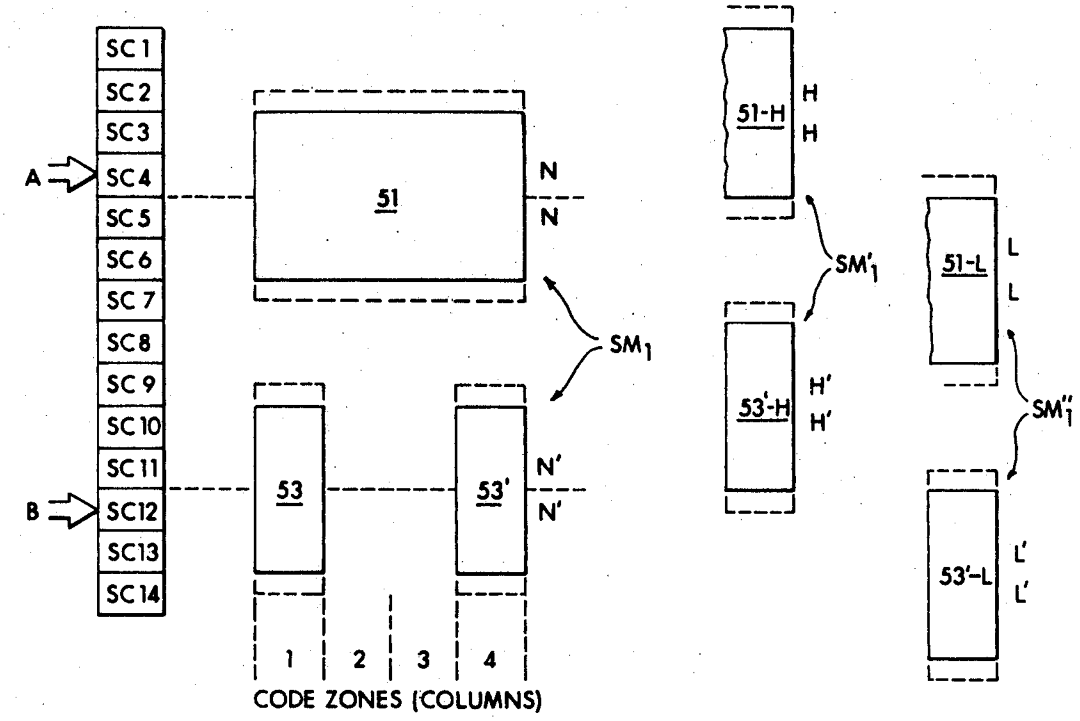
FIGURE 2 is a schematic illustration of the mark-sensing transducers of FIGURE 1 in relation to different illustrative positions for the mark images presented thereto by the arrangement of FIGURE 1.

The operation of the registration-select means is indicated very particularly hereinafter but will be better understood at the outset by consideration of the general functional indication in FIGURE 2. In FIGURE 2 bar image SMI has upper portion 51 and lower portions 53, 53′ shown in a prescribed (arbitrary) positional relation with cell array BC. Thus, it may be assumed that the portions of bar code pattern SMI which lie in horizontal registry with ones of cells BC will fully or partially illuminate these cells for charging energization thereof. Thus, in the neutral (or normal) position, shown, upper bar 51 (of the start mark SM) extends across solar cells SC3–SC6 to charge them to omit output voltages. Similarly, each of the lower bars 53, 53′ extend between cells SC10–SC13.

As will be seen below, such a positioning of bar code SMI will cause the registry-select control means described below to select two upper read cells SC4, SC5 and two lower read cells SC11, SC12 for reading operations, these four selected cells being indicated by the letter N. Other positions of pattern 11 are also indicated functionally by SM′1, SM″1 (upward misregistration) and $SM_1''$ (downward misregistration). Thus if start mark 51 were displaced upwardly as indicated by segment 51–H, a different pair of read cells SC2, SC3 indicated at HH would be selected. Conversely, for downward misregistration as indicated by segment 51–L, a third pair of upper read cells SC6, SC7 would be selected as indicated by the letters L, L. Thus it is a feature of the invention that read sensors SC may be selected to read mark characters in operable registry simply according to a registry-detection means sensing the locations of initial marks on one data track.

Similarly, in the case of the lower bars 53, 53′ and the associated lower read cells 9 through 14 if the card has been shifted or the pattern thereon moved or the like so that marks 53, 53′ extend across cells SC8 through SC11 as indicated by segment 53′–H an upward misregistration would be indicated and a different pair of read cells would be selected namely cells SC9, SC10 as indicated by letters H, H′. Similarly, a downward misregistration indicated at segment 53′–L, will cause the selection of a lower pair of read cells SC13, SC14 indicated schematically by the letters L′, L′. According to a feature of the invention as seen hereinafter, these indicated registry-selections of certain ones of lower sensors SC9–SC14 by interrogating upper sensors SC1–SC7 only can be made.

According to a feature of the invention, marks 51 etc. may be dislodged from the indicated reference location to occupy either or both of the upper and lower dotted-line limits without changing the indicated registration selection function.

In summary, the indicated registry-selection means will select one of three sets of sensors SC1–SC14 for reading according to correlation of a start-mark image SM; with upper sensors SC1–SC7; i.e. will select sensors SC4, SC5, SC11 and SC12 if sensors SC3–SC6 are properly "start-mark charged." Similarly, sensors SC2, SC3, SC9, SC10 are selected upon charging of sensors SC1–SC4; also, similarly for sensors SC6, SC7, SC13 and SC14 upon charging of sensors SC5–SC7.

READ SENSOR SELECTION

Referring now to FIGURE 3, the schematic block diagram indicates a preferred embodiment of a registration system according to the invention which is adapted to select the most appropriate (registered) ones of sensor cells SC1–SC14 in transducer array (or cell bank) BC in accordance with the vertical position of code mark images, such as SM, presented thereto from documents processed by a read station such as indicated in FIGURE 1.

Cell bank BC comprises a plurality of transducers, such as solar cells SC1–SC14, at least a portion of which (e.g. SC1–SC7) are coupled to a gating means GM for registration according to the invention. One feature of the invention is that registration may be derived from only a portion of a mark pattern, such as along track A of the multi-track pattern of coupons C, C′ etc. The balance of the transducers (e.g. SC9–SC14) may be connected to read-detector input terminals (e.g. to terminal LC, through registration switch means SM). Additionally, one of the transducers (e.g. SC8) may be arranged to provide sensing background indications as indicated below. The tranducers in bank BC preferably comprise photovoltaic transducers known in the art, such as the indicated solar cells SC1–SC14.

Sensors SC1 through SC7 inclusive are positioned so as to span the anticipated positional range of the optical image of reference portions of the mark pattern, i.e., along the image of upper bar track A. Similarly, sensors SC9 through SC14 are positioned as to span the range of the lower track image, i.e. of the marks along lower bar track B. A "normal" size mark image will span four sensors, i.e. four of upper cells SC1–SC7 and four of lower cells SC9–SC14; which four depending upon the vertical position of an image. The variance of this position, of course, presents the registration problem addressed by the invention. For various reasons this position will vary as a record traverses the read station (FIGURE 1) being imaged by a conventional optical system, illustrated here for simplicity as illumination means cooperating with a single, non-inverting projecting arrangement L.

Background sensor SC8 is located intermediate the upper and lower sensors such that it normally senses light reflected from inter-track strip 25 on cards C, C′ etc. intermediate track A and track B. The output signal from sensor SC8 thus indicates background intensity level and is coupled to a trigger threshold voltage stage TTV which develops a triggering threshold voltage which varies in accordance with the unmarked background level of the card. Stage TTV is such that it can assume a voltage corresponding to a background level and not be thereafter affected by viewing dark card surfaces, such as from the bar code. Such a circuit can, for example, include a condenser which rapidly charges in accordance with the detection of light from the card, and a comparatively slow discharge circuit which is activated by a dark area (printed surface) of the card. Thus, while the solar cell SC8 is positioned to normally receive light from the non-printed surface (25) of the cards should the vertical registration of the card vary to present part of the bar code (as on track A or track B) the threshold voltage developed by TTV will not be affected thereby.

The upper sensors SC1 through SC7 adapted to sense the image of upper track A, have their outputs coupled to a plurality of trigger stages T1 through T7 respectively.

Trigger stages T1 through T7 are adapted to provide a neagtive, logic-level, output signal when activated by their associated solar cells. To activate a trigger stage, it is necessary that the negative-going signal from related solar cell exceed the threshold voltage applied to the trigger by threshold stage TTV. Stage TTV is preferably adjusted to provide a threshold voltage whose value is approximately 50% of that developed on like sensors SC1–SC14 by background reflection (from "white" strip 25). Thus, marked portions of cards C, C′, etc. which develop negative going sensor output-voltages which exceed 50% of the reference (background reflections) level will activate associated trigger stages and indicate the presence of a "valid" bar character to gate stage GM.

Thus, of sensor bank BC, upper cells SC1–SC7 are coupled through associated triggers T1–T7; while central cell SC8 is coupled to threshold stage TTV. Lower cells SC9–SC14 are coupled to following read-detector means; cells SC10–SC12 also being coupled to associated triggers T10–T12 as indicated below. Of the upper trigger stages T1–T7, stages T1, T2, and T3 have their outputs coupled to an AND gate G1, which functions as a "high-card gate." Similarly, stages T3, T4, T5 and T6 have their outputs coupled to a second AND gate G2, which functions as a "neutral-card gate." In like manner, stages T5, T6 and T7 have their outputs coupled to a third AND gate G3, which functions as a "low-card gate." The "high-card," "neutral-card," and "low-card" AND gate circuits function as their names would imply, to control further selection circuitry of registration gating stage GM according to whether the vertical position of the card to be sensed is "high," "intermediate," or "low," enabling selection of the most appropriate ones (i.e. the ones in "image-registry") of sensor cells SC1–SC14 for reading information from the card by reading means RM (indicated in FIGURE 5).

Output signals from "high-card" AND gate G1 are coupled to an inverter I1 and thence to one input leg of an AND gate G5 of an upper latch circuit ULC which also includes a plurality of other similar AND gates, namely gates G4, G6, G7 and G8, and a pair of inverters I4 and I5 at the outputs of gates G4, G5 respectively. Inverters I4 and I5 have their outputs cross-coupled to their inputs via the aforementioned gating structure such that the latch circuit ULC will be caused to regeneratively switch to a "set" or "reset" state in accordance with the application of gate signals thereto. The reset state of the latch circuit will be understood to be the state wherein the latch provides a positive output signal from inverter I5.

In a similar manner, the output from "low-card" gate G3 is coupled to an inverter I3 and thence to one input leg of an "AND" gate G11. Gate G11 comprises part of a "low-card" latch circuit LLC which also includes a plurality of similar AND gates G9, G10, G12, G13, G14, and a pair of inverter stages I6 and I7 coupled at the outputs of gates G9, G10 respectively. The operation of "low-card" latching circuit LLC is the same as that of "high-card" latch circuit ULC whereby, upon prescribed gate conditions, the latch regeneratively switches to its reset state, reset being indicated by the presence of a positive output signal from inverter I7.

The normal or "neutral" gate G2 has its output lead connected via an amplifier A2 to one input leg of gate G7 in "high-card" latch ULC and also to one input leg of gate G12 in "low-card" latch LLC. As later explained, this coupling of the G2 output to both latches (ULC, LLC) provides a "neutral" homing of the registration circuitry according to a feature of the invention. That is the registration logic described (see gating means GM) will indicate "neutral" card registration first: when the input conditions of gate 62 are satisfied, even if the conditions for high-card or for low-card detection (gates G1, G3) are simultaneously satisfied and secondly: when no gates are satisfied. Thus, it will be seen that the presence of a negative output signal from gate G2 will cause latches ULC, LLC to remain unconditionally in a reset state.

The output signal from inverter I5 of the high-card latch is coupled to one input leg of an inverter I8; while, similarly, the output from the inverter I7 of the low-card latch is coupled to the other input leg. The resetting of both of latch circuits ULC, LLC will thus provide positive logic level signals to each input leg of inverter I8. The resultant negative output signal "NN" from inverter I8 is arranged to cause a "normal" card position indication from gating means GM, applied to switching stage SM for a selection of appropriate cells for mark reading. Thus, application of "normal-position" signal "NN" to upper and lower pairs of selection switches S4–S5, and S11–S12, causes them to close, coupling cells SC4, SC5, and SC11, SC12 to reader RM for "normal" reading. Similarly, a negative output from I5 will comprise a "high-position" signal (if ULC is in its set state) to energize switches S2–S3, and S9–S10 and thereby connect the "high-card sensors" SC2, SC3, and SC9, SC10 to scan the upper and lower tracks (A, B) and apply their outputs to a pair of upper and lower output amplifiers, A1 and A3 respectively. In a like manner, the negative output signal "LL" from the inverter I7 will, when "low-card" latch LLC is in its set state, cause the selection of the low-card sensors i.e. upper and lower sensors SC6, SC7, and SC13, SC14, respectively through activation of the associated selection switches S6, S7 and S13, S14 respectively.

The operation of the above registration means is initiated by the detection of a unique start mark SM (on the leading portion of card C—imaged at SM). Start mark SM may comprise a unique mark pattern on a pair of data-mark tracks (A and B). Thus, as indicated best in FIGURES 2 and 4, start mark SM may comprise bars in the first four columns of track A together with bars in the first and fourth columns (code zones) of track B. The registration circuitry is initiated by gating together certain ones of the solar cells in the upper and lower solar cell groups SC1–SC7 and SC9–SC14 respectively.

A gate-enabling means GEM comprising a plurality of AND gates G15–G18 buffered to an inverter I9, the output of which is coupled to three parallel multivibrators DMV1–DMV3 is provided to sequence the selecting operation of the registration circuitry GM independently of the vertical positioning of the card C. Thus, the output of solar cell SC10 is coupled, via an associated trigger stage T10, to one input leg of AND gate G16, which has for its second input the output signal from the trigger stage T3. Similarly, the output from the solar cell SC11 is coupled via trigger stage T11 to one input leg of the gate G17, which has for its second input, the output signal from the trigger stage T4. Likewise, solar cell SC12 has its output coupled via trigger stage T12 to one input leg of gate G18, which has for its second input, the output from the trigger stage T5. Each of trigger stages T10, T11 and T12 is activated when the associated solar cell provides a negative-going signal which exceeds the value of threshold voltage coupled thereto from threshold voltage stage TTV. As seen hereinafter cell pairs SC3–SC10. SC4–SC11 and SC5–SC12 function as upper, neutral and lower start mark detectors respectively, for initiation of gate-enabling stage GEM.

Figure 4:
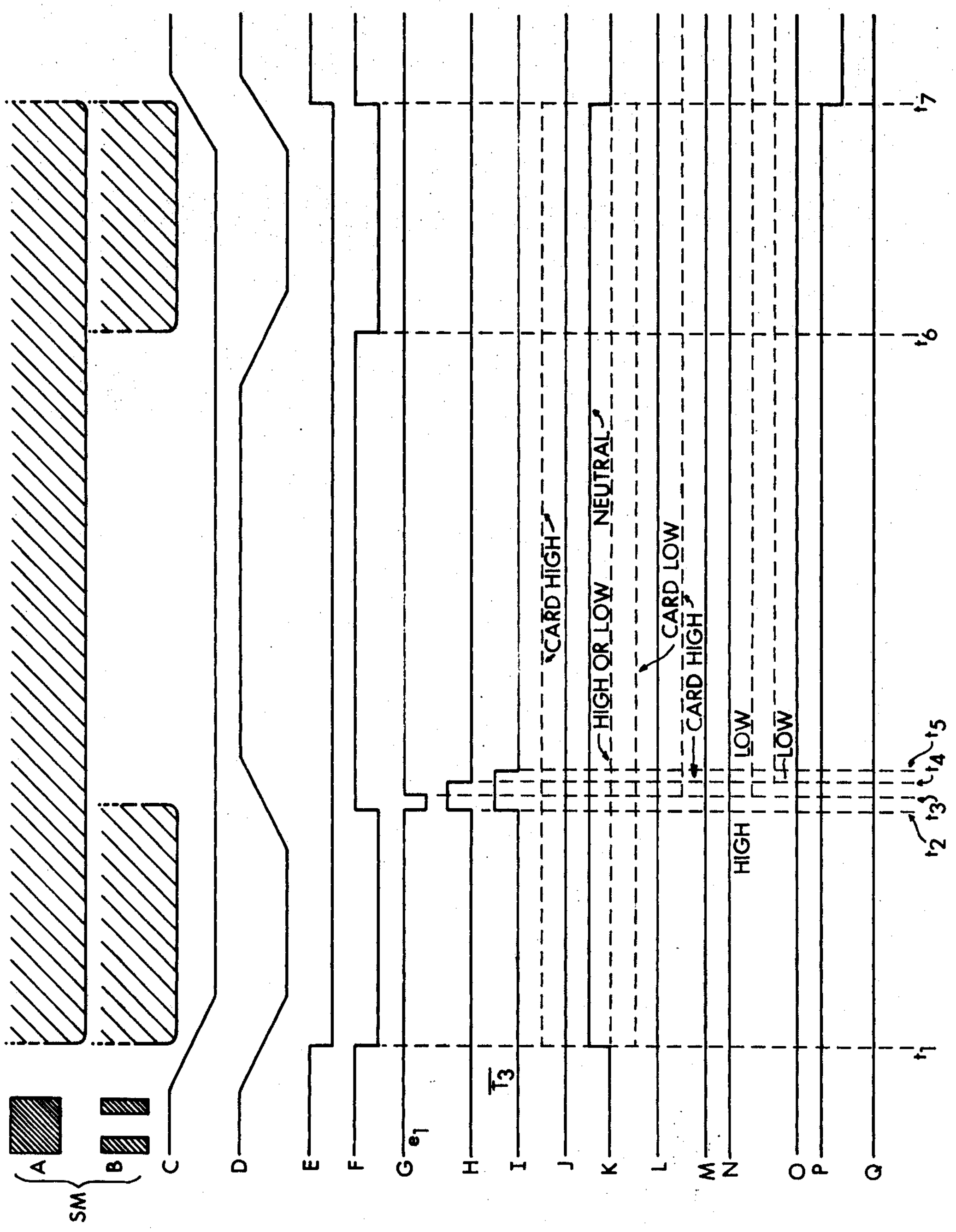
FIGURE 4 is a timing diagram wherein schematically-indicated bar- code images represent a typical bar-code, along different portions of which various waveforms are time-referenced to indicate the electrical state of associated control components of FIGURE 3 at sequential scan times when corresponding portions of the bar-code are being sensed.

Gates G16, G17 and G18 are buffered to an inverter I9, which has its output coupled to delay multivibrator units DMV1, DMV2 and DMV3, each of which is adapted to be started by the negative-going portion of signals applied thereto, to provide output pulses $e_1$, $e_2$, $e_3$ of 2, 4 and 6 microseconds duration respectively. It will be understood that the delay multivibrator units are activated when the enabling conditions for gates G16, G17 or G18 are no longer satisfied, causing the output of inverter I9 to go negative. This condition occurs at the first termination of the bar code on track B, i.e. at time $t_2$ (FIGURE 4). The output signal from delay multivibrator DMV1 is directly coupled to the gates G8 and G14 to reset high and low latch circuits ULC, LLC respectively from any previously attained set condition.

Delay multivibrator DMV2 has its output coupled to an inverter I10 and thence to one input leg of gate G6. Hence, when $e_1$ (the negative output pulse from DMV1) ends (FIGURE 4) the longer positive pulse $e_2$ (from multivibrator DMV2, made positive after inversion by the inverter I10) can "set" high-card latch ULC if gate G1 has been satisfied to provide a positive signal to gate G5. Similarly, the output pulse ($e_3$) from delay multivibrator DMV3 is coupled via an inverter I11 to gate G10. Thus, it will be seen that, at the termination of signals $e_1$, $e_2$, the longer duration signal $e_3$ will persist providing a positive signal to G12, to set the low-card latch LLC if neither "high-card" nor "normal-card" conditions have been satisfied, and if "low-card" conditions (on gate G3) are met, thus causing inverter I17 to apply a "low" switching signal "LL" to switching stage SM.

Approach-detector 43 preferably includes a solar cell SC15 (located upstream of reading cells SC1–SC14 of course) to be activated by the leading edge LE of approaching cards (e.g. C′). As seen in FIGURE 3, the activation of sensor SC15 activates an associated trigger circuit T15 to provide a negative, logic-level "approach" signal DP which is coupled to a delay multivibrator DMV4 in start/end indicating stage SEM. The output signal from the delay multivibrator DMV4 may be termed the document-presence signal *dp′* and is arranged to persist for a time which exceeds the time required for a card to pass completely by sensor bank BC and read-window 15. Signal *dp′* is coupled to the gates G4 and G9 associated with the high- and low-card latch circuits ULC, LLC respectively. The absence of this signal will thus disable this selection circuitry during non-card intervals, leaving a neutral (home) selection.

Detector stage SEM also comprises a start-mark recognition stage SMR coupled to set FF (to indicate card-presence as above) on detecting a start mark, and a companion end-mark recognition stage EMR coupled to reset FF upon detections of an "end-mark." A pair of upper and lower input triggers UCT, LCT respectively are each coupled to SMR and to EMR to apply signals from prescribed ones of sensors SC1–SC14 thereto during registry-select time, as indicated below.

Signal *dp′* is also coupled, through an inverter I12, to the reset line of a flip-flop FF, having its output coupled to the input lead of a gate G15. FF, after being set by the detection of a valid start mark, provides a "gate-energizing" signal for gate G15 and thereby prevents the retriggering of the multivibrators DMV1–3 due to the loss of gate energizing signals to the gates G16–G18 during the entire read cycle.

The three selections possible by the registry-select arrangement will be evident. Thus, each of the solar cells SC2–SC7 and SC9–SC14 have their outputs directly coupled by means of cables SCU and SCL respectively to selection switches S2–S7 and S9–S14 respectively comprising selection means SM. The selective energization (by signal UU) of the upper high-card switches S2, S3, will cause the related sensors SC2 and SC3 to be connected to the inputs of an upper output amplifier A1; similarly, the energization of the lower high-card switches S9, S10, will cause the related sensors SC9 and SC10 to be connected to the inputs of a lower output amplifier A3. Alternatively, the selection of the neutral card switches S4, S5 and S11, S12 will cause their like-numbered solar cells SC4, SC5 and SC11, SC12 to be directly connected to the amplifiers A1 and A3 respectively. In like manner, the selection of the low card switches S6, S7 and S13, S14 will cause their related solar cells SC6, SC7 and SC13, SC14 to be connected to the amplifiers A1 and A3 respectively.

Output amplifiers A1, A3 are identical in design, each amplifier providing output signals on terminals UC, LC respectively in accordance with the sum of the two solar cell input signals applied thereto. The purpose for utilizing two adjacent solar cells for the detection of signals from each track is to ensure proper operation of the system, even when mark-patterns on the cards are themselves defective. If a single sensor cell were used, and that cell were not to detect a bar condition due to the presence of a pinhole or other obliteration of the associated mark-bar beneath its zone of inspection, then information would be inadvertently lost. However, when two adjacent sensor cells are used, and a valid bar condition is assumed to exist if either one or the other or both of the solar cells detect a bar condition, then the presence of an obliterated bar portion will have no effect on the successful operation of the circuit. Thus, to insure a proper operation of the system under the aforementioned adverse conditions, two sensors are used in each track for the purposes of reading information therefrom.

The output signals from the amplifiers A1 and A3 are coupled to trigger stages UCT and LCT respectively which form a logic level signal from the analog output signal from the amplifiers A1 and A3. The logic level signals from upper and lower triggers UCT, LCT are coupled to the inputs of start-mark recognition circuit SMR and end-mark recognition circuit EMR which responsively provide a logic level output signal upon recognition of start-mark and end-mark codes respectively. These output signals as mentioned control flip-flop FF. Thus, circuit SMR sets flip-flop FF to apply an enabling signal to gate G15. Thus, inverter I9 provides a control signal independently of gates G16–G18 to prevent the re-triggering of multivibrators DMV1–DMV3 after recognition of a start mark. The stages UCT, LCT, SMR, EMR and FF of start/end control means SEM are therefore adapted to enable or disable the switching of the latching circuits ULC, LLC during the reading of a card, that is, during the interval after a start-mark has been recognized and before the end-mark has been recognized.

An output signal from end-mark recognition circuit EMR resets flip-flop FF to conversely disable G15, permitting the operation of the delay multivibrators DMV1–DMV3 during the reception of a subsequent start mark code from the next occurring card. As previously mentioned, the delayed-card-presence signal from multivibrator DMV4 and inverter I12, insures the resetting of the flip-flop at a time period long after the end-mark should have been read to effect this. Thus, flip-flop FF will be automatically reset even if the last card read was so torn or otherwise unable to provide valid end-mark recognition by EMR.

OPERATION

The read-select operation of the registration detection circuitry of FIGURE 3 will now be examined closely with the aid of the waveforms of FIGURE 4 where curves A and B show in exemplary fashion the lower portions of upper and lower enlarged start-mark patterns respectively. At time $t_1$ in the waveforms, the solar cells associated with the track A and track B bar codes provide a negative-going voltage in response thereto. Assuming that the card is in "neutral-card" position, cells SC3–SC6 (associated with track A) will provide a negative-going voltage as indicated by curve C, while cells SC10–SC13, associated with track B provide a negative voltage representing the darkened bar-code portions of curve B, as indicated by curve D. When the voltage levels from the solar cells SC3–SC6 and SC10–SC13 exceed the negative threshold voltage value provided by the solar cell SC8 in conjunction with its associated threshold trigger voltage generator TTV, their associated trigger stages T3–T6 and T10–T12 will be activated, as indicated by the negative-going levels in the waveforms of curves E, F respectively.

Between times $t_1$, $t_2$, the gate-activating conditions required by one or more of the gates G16–G18 will have been satisfied by the simultaneous presence of negative logic level signals at the inputs thereof, since a bar code mark is present on tracks A and B. However, at time $t_2$, the lower track bar code mark terminates and gates G16–G18 are no longer activated. Inverter I9 now provides a negative-going output signal to initiate the operation of delay multivibrators DMV1, DMV2 and DMV3. The output waveforms of multivibrator DMV1, and of multivibrators DMV2 and DMV3 after inversion by inverters I10 and I11, respectively, are shown by the waveforms of curves G, H and I respectively.

During the interval $t_2$–$t_3$, the negative-going pulse from DMV1, which is of approximately two microseconds duration, is applied to gates G8 and G14 of high and low-card latches ULC, LLC respectively to reset them from a prior set condition caused by a previous selection of the high or low-card registration positions.

At time $t_3$, the negative-going signal derived from delay multivibrator DM1 terminates while the inverted output signal from the delay multivibrator DMV2, which persists for 4 microseconds, is still at a positive logic level. This positive level, which is applied to gate G6, will enable the setting of the high-card latch, if the input conditions for gate G1 have been satisfied, to provide a positive signal at the gate G5.

At time $t_4$, after the termination of the output signal from delay multivibrator DMV2, the inverted output from multivibrator DMV3 which persists for 6 miscroseconds, is still positive. If neither the neutral nor the high-card gate circuits have been selected, this positive pulse will then be effective, when applied to gate G10 to enable the setting of the low-card latch circuit LLC provided input conditions for low-card gate G3 are satised, to thereby couple a poitive logic level signal to gate G11.

If the neutral card gate conditions are met, neither the high nor low card latch circuits can be placed in their set state, since gate G2 will provide a negative signal to gates G7 and G12 during the interval $t_3$–$t_5$, then preventing the setting of the latches. Thus, "natural" detection overrides all; while "high" detection overrides "low" in cases of plural or ambiguous detection signals.

If high-card latch ULC is selected, a negative output signal, takes from the output of the inverter I5 and coupled to one input of gate C13, will inhibit the lower latch LLC from being selected during interval $t_4$ to $t_5$. If neither the high nor low-card latches have been set during their multivibrator-enabling intervals, registry selection circuit GM will automatically assume the normal-card condition (neutral) and remain there for the duration of the card read cycle.

The enabling multivibrators DMV1–DMV3 are prevented from further activation during the reading of information from the card by the activation of gate G15 upon detection of the start-mark at time $t_7$.

The waveforms of curves J, K, L show the output signals from inverter I1, aplier A2 and inverter I3 respectively when the card (mark image therefrom) is in its "neutral" registration position. The dotted-line portions of these waveforms occur when the cards are in a high or a low registration position, as labelled. Thus, the waveform of curve J illustrates, in dotted form, the positive-going logic signal which will occure at the output of inverter I1 when the card is located in a high-registration position. Similarly, the waveform of curve K shows, in dotted form, the resulting logic-level signal which would occur at the output of amplier A2 had the card been placed in a high or in a low vertical registration position. In alike manner, the dotted portion of the waveform of curve L shows the resultant logic-level signal that would occur at the output of inverter I3 had the card been placed in a low registration position.

The waveforms of curves M, N and O show the signals present on the high, neutral and low card output lines, i.e. the outputs of inverter stages I5, I8 and I7 respectively, being applied to the selection switches S2–S14. Shown by the dotted lines curves M, N, O are the waveforms which would result had the card been registered high or low with respect to the cells in bank BC. The waveform of curve F shows the positive output signal coupled from flip-flop FF to gate G15 during the interval preceding the detection of the start mark, and the negative signal coupled to gate G15 thereafter. The waveform of curve Q illustrates the logic level signal derived from delay multivibrator DMV4, this signal persisting at a negative level from the detection (by sensor SC15) of the leading card edge until a period of time has elapsed which exceeds the time required for the card to have past beyond sensor bank BC and window 15.

Figure 5:
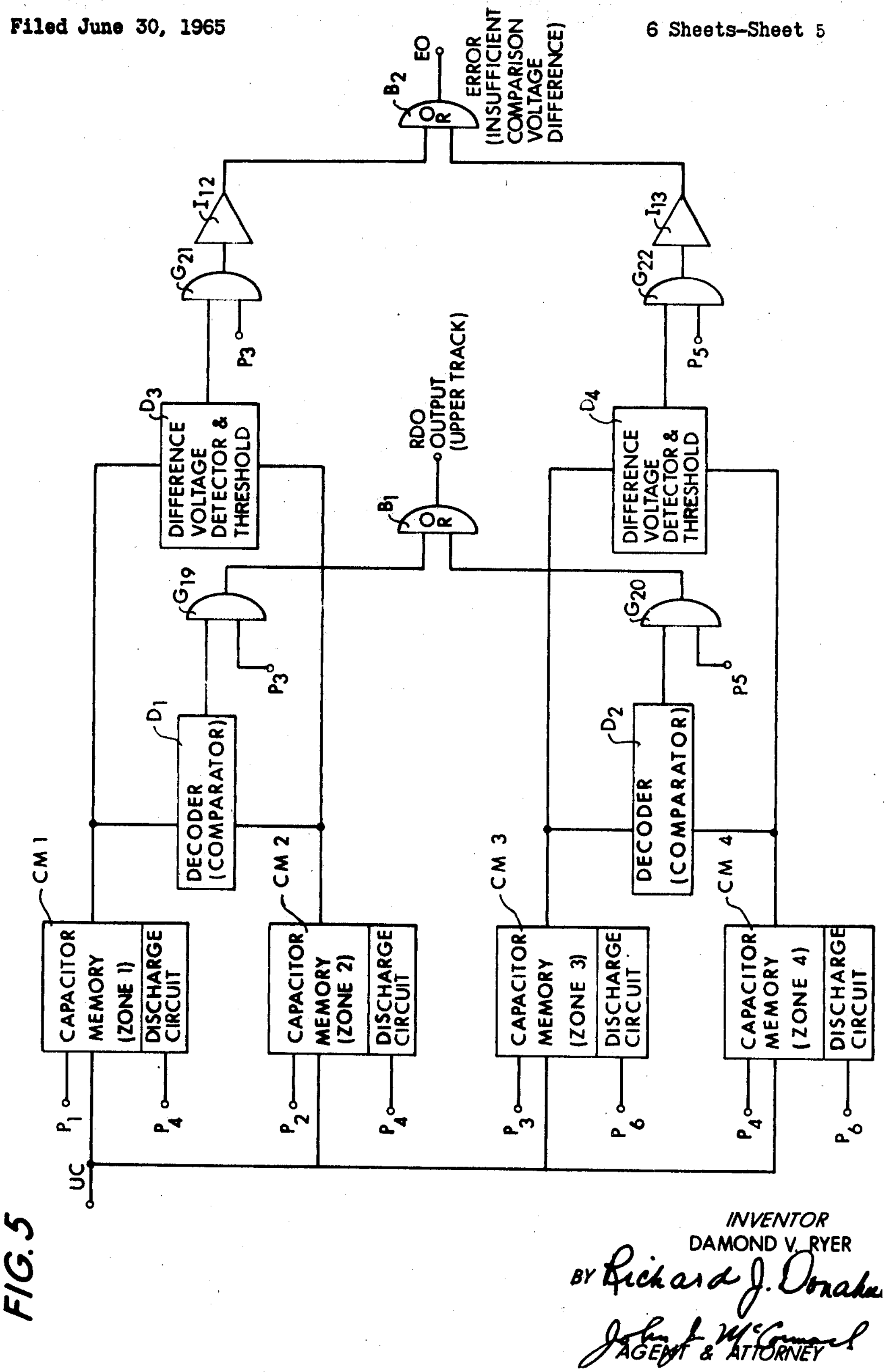
FIGURE 5 is a schematic block diagram of a read detector system (in part) adapted to decode the output provided by transducers in FIGURE 1 which are registration-selected by the arrangement in FIGURE 3.

Referring now to FIGURE 5, there is shown read circuitry adapted to interpret the serially occurring mark-indicating signals from sensor bank BC (upper portion only) and to generate encoded binary information signals responsive thereto. Further, circuitry is shown which provides an output error indication if the difference in the voltage derived from a pair of serially occurring di-bit marks in insufficient to indicate the fact that a valid bar-mark, followed by a space condition has been found or the converse. Such an error condition might occur if, for example, the bar were to span two adjacent column zones if there were no ba printed into adjacent columns, or if there was a small shading between two adjacent columns which might erroneously be interpreted as a bar and a non-bar condition.

Since the reading circuits required for tracks A and B are the same, only that for upper channel track A is shown. This consists of four capacitor memory stages CM1–CM4, each of which has its input connected to the upper output terminal UC of upper output amplifier A1 in FIGURE 3. Each of the capacitor memory stages CM1–CM4 has associated therewith a capacitor discharge circuit which is activated upon reception at its input terminal of a pulse signal P1–P4 respectively. Memory stages CM1 through CM4 are adapted to store the information derived from the first four columns which serially occurred during the reading of a card. To implement the read circuitry, six repetitively occurring timing pulses P1–P6 are generated. The first pulse P1 enables the capacitor memory CM1 during passage of column 1 (FIGURE 6) past bank BC. Similarly, the pulses P2–P4 enable memory stages CM2–CM4 during the detection for the second–fourth columns respectively.

Each di-bit code occupies two adjacent column positions on the card. Thus, having stored information in memory CM1 during the column 1 interval, and in memory CM2 during the column 2 interval, output signals therefrom are now coupled to a first decoder D1 which compares the voltages stored in memories CM1 and CM2. Decoder D1 may take the form of a differential amplifier which provides an output signal at its output terminal to one input of a gate G19, for a valid binary "1" condition. This condition is defined by the occurrence of a bar during the column 1 interval plus a "non-bar" condition ("white" space) during the column 2 interval. During the interval P3, when memory CM3 is being enabled, the P3 pulse is also coupled to the other input leg of gate G19 to transfer the binary 1 voltage level through gate G19 to the input of an OR gate B1 and thence to the output terminal RDO for track A. During the fourth column interval, when memory CM4 has been enabled, memories CM1 and CM2 are discharged by coupling the P4 signal to their respective discharge circuits. During the interval P5, a comparison is made in a second decoder stage D2 of the signals stored in memories CM3 and CM4. This signal, is now coupled to one input leg of an AND gate G20, which transfers the binary voltage level indication to output terminal RDO via gate B1 upon application of the P5 pulse to gate G20. The P6 pulse, which occurs during the sixth column-transition of the card, is used to reset memories CM3 and CM4 by coupling the P6 pulse to the discharge circuits thereof. Thus, during the six column transition intervals noted above (one read-cycle), two pairs of di-bit codes have been coupled to the capacitor memories, have been compared to provide two binary output signal levels and have been reset for subsequent operation.

Figure 6:
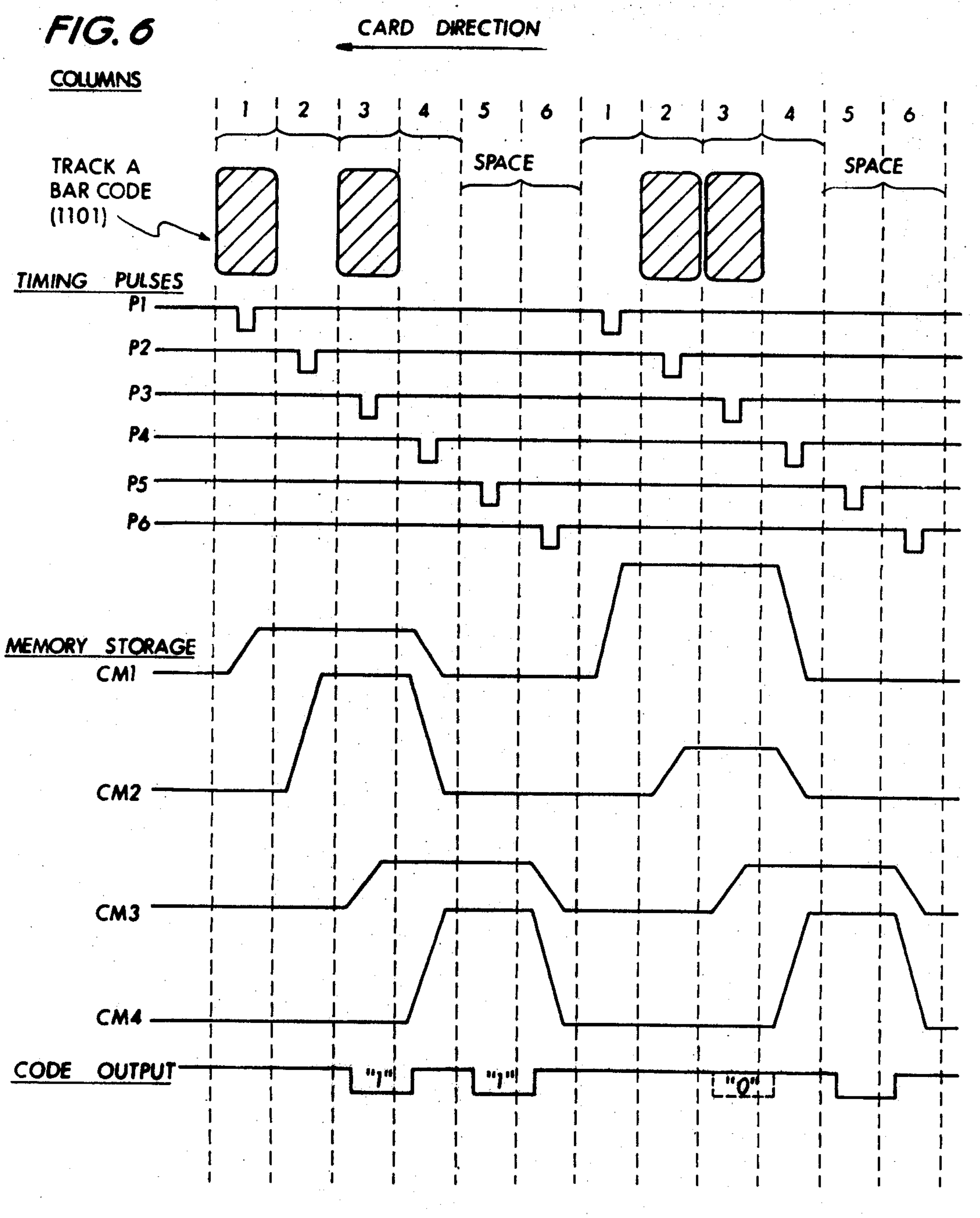
FIGURE 6 is a timing diagram correlating portions of a bar-code image with the state of decoder elements in FIGURE 5 at indicated scan times in two successive scan cycles.

The operation of the aforementioned read circuitry is perhaps better understood by reference to FIGURE 6 of the drawings. Here, there are shown typical bar-marks in 12 consecutive columns, in which have been stored the binary code 1101. Thus, it is apparent that a binary 1 is indicated by a bar/no-bar condition in the first and second columns of the card. The above-mentioned timing pulses P1 through P6 are shown in time reference with respective columns. It will be clear that one timing pulse occurs for each of the six column positions in a read-cycle and is repeated for each occurring set of six consecutive columns. Waveforms are shown for the memory storage portions of memories CM1–CM4 during these pulse times. Thus, during the transition of column 1, capacitor memory CM1 charges to a low voltage condition due to the presence (detection) of a bar-mark. Memory CM2, on the other hand, charges to a much higher voltage due to detection and reception of a "space-indicating" signal. During the third column position, while memory CM3 is detecting a bar, indicated by the low value of the voltage therein, a valid binary 1 signal is read out of the apparatus of FIGURE 5 by a comparison of the voltage levels stored in the memories CM1 and CM2. During the fourth column position, while memory CM4 is charged to a high value due to the detection of a space condition, the memories CM1 and CM2 are shown as reset to a zero voltage charge condition. During the occurrence of the fifth and sixth column transitions, a comparison is made between memories CM3 and CM4 to read out a second binary 1 value, and then memories CM3 and CM4 are reset.

A second cycle of operation is also shown in which the first two column transitions have recorded a di-bit code representative of a binary "0" condition. Thus, during the first column interval, memory CM1 is charged to a high voltage level due to indication of a space condition. During the second column interval, memory CM2 is charged to a much lower value due to indication of a bar condition. Now during the readout interval for the just-stored di-bit code, a comparison is made between the voltages stored in memories CM1 and CM2, which comparison results in no output from the comparator stage D1 and results in no coupling of a signal to the output terminal during the occurrence of the P3 pulse condition.

Returning now to FIGURE 5, there is also shown apparatus which provides an error output indication if the compared voltages in the memories are less than a predetermined value. Such error detection apparatus may be required since the decoder might otherwise provide a valid output signal based on minor differences in the detected signals from memories CM1 and CM2, or CM3 and CM4. Such minor differences might occur, for example, if a pair of bars had been printed in successive column zones, those bars differing from one another by a small shading or coloring. Also, such a condition might occur if no bars were printed into successive zones of a di-bit location but the granular surface of the card provided a small difference in reflected light from the two zones.

The error detection circuitry shown by FIGURE 5 consists of a pair of different voltage detectors D3 and D4 having their inputs coupled to memories CM1, CM2 and CM3, CM4 respectively. Each difference voltage detector provides an indication of the difference in a voltage existing across the capacitor memories and further provides a "threshold level" signal which must be exceeded in order to provide an output signal condition therefrom to a pair of AND gate circuits G21 and G22 respectively. AND gate G21 is activated during the P3 pulse occurrence, i.e. during the zone following the loading of the memory stages CM1 and CM2 with di-bit information. If there is a sufficient voltage difference detected by difference-voltage detectors D3 and D4, this signal will be coupled to AND gates G21 and G22 and the inputs of a pair of inverters I12 and I13 respectively. The outputs from inverters I12 and I13 are coupled to an OR gate B2 to the error detection terminal. An error is indicated if a positive-going signal is received at the error detection terminals during the readout periods, i.e. the time intervals during the reception of the P3 and P5 pulses. Note that a positive-going signal is only received at the error detection terminal during the P3 or P5 intervals if there was not a positive-going signal applied to inverter I12 or to inverter I13 during these intervals, which positive-going input signal is indicative of a sufficient difference voltage having been stored within memories CM1, CM2 or CM3, CM4.

While in accordance with the provisions of the patent law, the above has illustrated and described the best form of the invention and its mode of operation, it will be apparent to those skilled in the art that changes may be made in the apparatus described without departing from the spirit and scope of the invention, as set forth in the appended claims and that, in some cases, certain features of the invention may be used to advantage without corresponding use of other features, while certain features may be changed or substituted for equivalently, as appreciated by those skilled in the art.

Having thus described the invention, what is claimed as new and desired to be secured by Letters Patent is:

1. A mark recognition system adapted to interpret patterns of encoded marks serially impressed upon a record medium along a track direction thereof, said system comprising a plurality of sensing means each having an output for emitting a sense pulse in response to the presence of one of said marks, said sensing means being aligned to scan columnar positions of said patterns oriented transverse to said track direction and extending across a number of registration locations;

read means adapted to receive said outputs and convert said pulses into message information;

circuit means connecting said outputs to said read means, said circuit means including selectively operable switch means for each of said outputs; and registration select means providing switch control signals to said switch means to selectively and directly connect to said read means only the output of ones of said sensing means in registration with said marks;

said registration select means including a plurality of gate means, each said gate means being connected, respectively, to the outputs of a different plurality of said sensing means;

a plurality of latch circuit means connected to said gate means for logically combining the outputs of said gate means to produce said switch control signals; and means for enabling said latch circuit means in a prescribed order to sequentially interrogate said latch circuit means and selectively provide high, low and neutral registration signals in response to the presence of a mark.

2. A mark recognition system as described in claim 1 further including start/end detecting means responsive to the presence of a record for generating an interrogate-enabling signal and applying said interrogate-enabling signal to said latch circuit means and to said enabling means during the entire read cycle of a record transit.

3. A mark recognition system as described in claim 2 wherein said patterns of encoded marks comprise at least two tracks of marks separated by a blank strip, wherein said enabling means include a plurality of staggered interval pulse generating means responsive to said interrogate-enabling signal, and further including means for generating a threshold voltage signal in response to the output of a predetermined one of said transducers, a plurality of threshold-normalizing means connected between said threshold voltage generating means and each transducer in said group; and circuit means supplying said threshold voltage signal to each of said normalizing means.

4. Apparatus for scanning di-bit marks impressed on at least a pair of tracks adjoining each other along a blank intermediate strip in a storage medium, said pair of tracks being subjected to displacement from a home position with respect to said scanning apparatus, said apparatus comprising a column of adjacent sensing means bracketing the images of said tracks along a plurality of displacement positions, said column including first and second pluralities of adjacent sensing means each bracketing a track inclusive of said strip when said home position, each said sencing means having an output for emitting a sense pulse in response to the presence of one of said marks;

read means adapted to receive said outputs and convert said pulses into message information;

circuit means connecting said outputs to said read means, said circuit means including selectively operable switch means for each of said outputs;

registration select means for logically combining only the output signals of said first plurality of sensing means to derive registration control signals each indicating registration of said track with different ones of all of said sensing means;

said switch means being responsive to said registration select means for selectively and directly connecting only registered ones of said cells to said read means; and ordering means including means for producing a plurality of staggered interval pulses responsive to the outputs of said second plurality of sensing means for ordering the operation of said switch means to sequentially interrogate said registration means to selectively provide high, low and neutral registration signals.

References Cited

UNITED STATES PATENTS

| | | | |
|---|---|---|---|
| 3,142,761 | 7/1964 | Rabinow ---------- | 340—146.3 |
| 3,173,126 | 3/1965 | Rabinow et al. ---- | 340—146.3 |
| 3,086,121 | 4/1963 | Cockrell. | |
| 3,104,369 | 9/1963 | Rabinow et al. ---- | 340—146.3 |
| 3,106,706 | 10/1963 | Kolanowski et al. -- | 340—146.3 |
| 3,322,935 | 5/1967 | Wyke et al. | |

MAYNARD R. WILBUR, Primary Examiner

THOMAS J. SLOYAN, Assistant Examiner

U.S. Cl. X.R.

250—219; 340—146.3

UNITED STATES PATENT OFFICE

CERTIFICATE OF CORRECTION

Patent No. 3,496,340 February 17, 1970

Damond V. Ryer

It is certified that error appears in the above identified patent and that said Letters Patent are hereby corrected as shown below:

Column 14, line 1, after "start/end" insert -- mark --; line 30, before "home" insert -- tracks are in said --; same line 30, "sencing" should read -- sensing --.

Signed and sealed this 22nd day of December 1970.

(SEAL)
Attest:

Edward M. Fletcher, Jr.
Attesting Officer

WILLIAM E. SCHUYLER, JR.
Commissioner of Patents